United States Patent [19]

Bacus

[11] 4,175,860
[45] Nov. 27, 1979

[54] DUAL RESOLUTION METHOD AND APPARATUS FOR USE IN AUTOMATED CLASSIFICATION OF PAP SMEAR AND OTHER SAMPLES

[75] Inventor: James W. Bacus, Hinsdale, Ill.

[73] Assignee: Rush-Presbyterian-St. Luke's Medical Center, Chicago, Ill.

[21] Appl. No.: 801,623

[22] Filed: May 31, 1977

[51] Int. Cl.$^2$ ............................................. G01N 33/16
[52] U.S. Cl. ......................................... 356/39; 350/20
[58] Field of Search .................................... 356/39–42, 356/73, 102; 250/222 PC; 350/20, 175 TS; 358/107; 235/555, 560–564, 574–580

[56] References Cited

U.S. PATENT DOCUMENTS

| | | | |
|---|---|---|---|
| 3,637,282 | 1/1972 | Hayamizu et al. | 350/175 TS |
| 3,770,349 | 11/1973 | Legorreta-Sanchez | 356/102 |
| 3,851,972 | 12/1974 | Smith et al. | 356/72 |
| 3,895,854 | 7/1975 | Ziffer | 350/20 |
| 4,061,914 | 12/1977 | Green | 356/39 |

Primary Examiner—John K. Corbin
Assistant Examiner—Wm. H. Punter
Attorney, Agent, or Firm—Fitch, Even & Tabin

[57] ABSTRACT

A method and apparatus is disclosed for use in performing automated classification of cells of a pap smear as well as other types of cells, such as red blood cells and blood cell neutrophiles. The apparatus generates an image that is split into two paths, (1) a high resolution image of primarily the nucleus of a cell, and (2) a low resolution image of the total cell, nucleus and cytoplasm. An image scanning device located in the first path provides output signals representing the image and circuitry performs measurement and analysis relating to texture of the nucleus. The image in the other path is demagnified which provides an enlarged, lower resolution image of the entire cell, including the nucleus and the cytoplasm and it is projected to a second image scanning device, which provides electrical signals that represent the image of the larger area and circuitry performs measurement and analysis relating to the size, density and color of the cytoplasm and the nucleus. The analysis obtained from each of the two circuits are applied to classification logic circuitry for the purpose of determining malignant cells.

7 Claims, 8 Drawing Figures

LINE SCAN TRANSITION
PROBABILITY MATRIX $P(i/j)$

DUAL RESOLUTION METHOD AND APPARATUS FOR USE IN AUTOMATED CLASSIFICATION OF PAP SMEAR AND OTHER SAMPLES

The present invention generally relates to a method and apparatus for automatically classifying cells and, more particularly, for use in automated pap smear analysis.

There are presently in excess of 70 million women in the United States that are at risk for cervical cancer and such cancer occurs in approximately 46,000 of these women, of which about 12,000 die yearly. The pap smear test has been used for the past 30 years in the early detection of this type of cancer. In its essential form, this test is a highly subjective visual inspection involving the tedious examination of thousands of microscopic cell images by highly trained medical personnel which acquire, prepare and analyze the smears. These procedures are time-consuming and costly, but they have led to early detection and a drastic reduction in the death rate for women who have the test performed regularly. To further reduce the death rate through early detection, it is recommended that all women over the age of about 18 have a pap test once a year and that women over 40 have one twice a year. At the present time, about 16 million tests are performed each year which is, of course, far short of the number of tests that would be required to test the 70 million women who are at risk.

It should be apparent that because of the high volume of tests that are and should be performed, that an automated or semi-automated cervical cancer detection technique would be extremely desirable in that it would lower the cost of the tests and enable clinical personnel to be used more efficiently. Automation techniques may also increase the accuracy and performance of the tests and allow for standardization of one screening laboratory to another. Because the use of automation offers so many significant advantages in the analysis of pap smears, researchers have attempted to construct apparatus for doing so for the last 20 years. Researchers have devised various classification strategies to process individual epithelial cell nuclei and to make normal versus abnormal screening decisions based on these strategies. These attempts have been unsuccessful. More current research efforts have been centered upon attempts to disaggregate the epithelial cell preparations and to analyze cells singly in suspension as they flow through various measurement orifices. These procedures have limited resolution in the microscopic morphological sense, but do measure properties of cells in terms of such features as increased DNA content, nuclear fluorescence and the ratio of the size of the nucleus to that of the cytoplasm. These attempts have also been unsuccessful. Other more recent research has attempted to classify individual cells using multiple features that are obtained from a high resolution digital image processing analysis.

Neither of these research strategies, i.e., the low resolution flow or high resolution digital image processing, have proved to provide suitably low false positive and false negative cell classification error rates to the extent that they can be used in a screening system that would result in an acceptable substitution for the presently used manual human visual inspection system. Much of the difficulty in judging a specimen as being negative or positive lies in the fact that a positive specimen involves the detection of a very small subpopulation, i.e., on the order of 10 cells out of 10,000 to 100,000 epithelial cells that are present on a cell slide. Various attempts have been made to make these decisions based on one or two criteria, such as excessive size of the nucleus, a correlation between the number of leukocytes in the smear, nuclear density and the ratio of the nuclear size to the cytoplasm size. What has been found as a result of these atttempts is that a single parameter generally will overlap somewhat between normal and abnormal cells and no single parameter is sufficient to provide the requisite accuracy in making the positive or negative decision regarding malignancy.

When high resolution scenes of the nucleus are analyzed using digital techniques, the information content of the entire cell is sacrificed and significant information that can be used to determine abnormality is no longer present. Similarly, when a scene of the entire cell is analyzed using digital techniques, insufficient resolution of the nucleus is present to provide information that is needed to make an accurate decision. Apparatus that has been developed in which prescreening, staining and identification of possible suspicious cells, which are then examined by a technician with higher resolution, has not met with significant success, primarily because of the presence of artifacts and other debris which have been flagged. Excessive technician fatigue results from examining each location to determine whether a suspicious cell or an artifact is present. In some systems, it is necessary for the technician to refocus the apparatus at each new location and it is generally felt that such prescreening systems which require subsequent examination and which do not adequately disregard artifacts are a nuisance which results in excessive technician fatigue and consequent lower efficiency and throughput.

Unlike the above described apparatus which primarily use single parameters or multiple parameters that are obtained from a single resolution scene, the present invention utilizes many parameters that are derived from significantly different resolution images and features are measured and analyzed from the different resolution images. This enables simultaneous analyses to be performed which could not be obtained by any sampling or analog-to-digital conversion scheme that operates at a single optical resolution.

With present manual human techniques, a cytologist scans a field of cells at low resolution looking for a suspicious cell or group of cells and then readjusts the microscope to a higher resolution when a suspicious area is encountered to obtain a better view of the size, shape and color of the cells and particularly of their respective nuclei. The texture of the nuclei, the size of the nucleus, its size in relationship to its associated cytoplasm, and the color of the nucleus seem most important in the human analysis. Such human analysis involves a sweep of the slide and it is doubtful that the observer views all of the cells on the slide and may, in fact, miss a critical area of cells. However, this is understandable in view of the fact that there may be from 10,000 to 100,000 cells on the slide. From the standpoint of time, the cytologist usually examines a slide within about five minutes time and has available the patient's medical history which provides further information to aid the cytologist in the pap smear analysis. While the exact error rate for human analysis of pap smear slides is unknown, the research done to date indicates the error rate may be high.

In order for an automated analysis to be commercially salable, it is generally felt that it must at least match the performance of the cytologist in at least one or more of the important areas of speed, cost and accuracy without having any serious or fatal fault in other areas. It is thought that an automated pap smear technique should classify cells faster than the cytologist, e.g., in a period of one or two minutes. This involves prescreening extracting features, and classifying between 10,000 to 100,000 cells in one or two minutes. Because the automated apparatus will view substantially all of the cells on the slide, and the cytologist does not, it should outperform the cytologist in this area. Furthermore, the error rate for false positives or false negatives for the automated apparatus should at least equal that of the average cytologist and hopefully much better than the subjective judgment of the cytologist. Further, the automated system is capable of counting the various classes of cells to provide new data, not heretofore available, on a mass scale which may provide a new and powerful tool for the analysis of pap smears.

From the above, it can be seen why a successful automated pap smear system has not been developed and why there is a need for such a system. Despite the millions of dollars that have been spent in research to develop such systems, none has been successful to the extent of being marketed and sold in commercial quantities in the United States of America.

Accordingly, it is an object of the present invention to provide a method and apparatus for analyzing tissue and cell samples, particularly pap smear in a manner whereby maximum useful information can be obtained by providing significantly different resolution images of cells of interest in the samples and extracting features from the different resolution images to enable more accurate classification of cells.

Another object of the present invention lies in the provision for using the high resolution image for extracting features that require high resolution, i.e., analysis of texture of the nucleus of a cervical epithelial cell or analysis of the boundary shape of red blood cells, and using the low resolution image for extracting features that do not require high resolution, i.e., analysis of size and density of the cytoplasm and nucleus of cervical epithelial cells or analysis of hemoglobin content of red blood cells.

A still further object of the present invention is to provide an automated pap smear apparatus which analyzes the cell with a first opto-electronic means and which simultaneously analyzes the nucleus with a second opto-electronic means.

Yet another related object lies in the provision for simultaneously and independently measuring and analyzing the high and low resolution images which facilitates fast overall analysis and classification of the sample.

A more detailed object of the present invention is to provide a method and apparatus that is particularly adapted for use in automatically analyzing pap smears, by providing a high resolution digitized scene of the nucleus of the cell from which measurements and analysis can be performed, and also by simultaneously providing a lower resolution digitized scene of the entire cell including the nucleus from which other measurements and analysis can be performed. The measurements and analysis of both scenes are simultaneously carried out using independently operable circuitry so that the speed of operation is maximized due to the simultaneous operation and because of the fact that only the necessary amount of data is operated on by the circuitry to provide the desired feature information and redundant data analysis is minimized.

Other objects and advantages will become apparent upon reading the following detailed description in conjunction with the attached drawings in which:

FIG. 1 schematically illustrates one apparatus that embodies the present invention;

Figure 1:
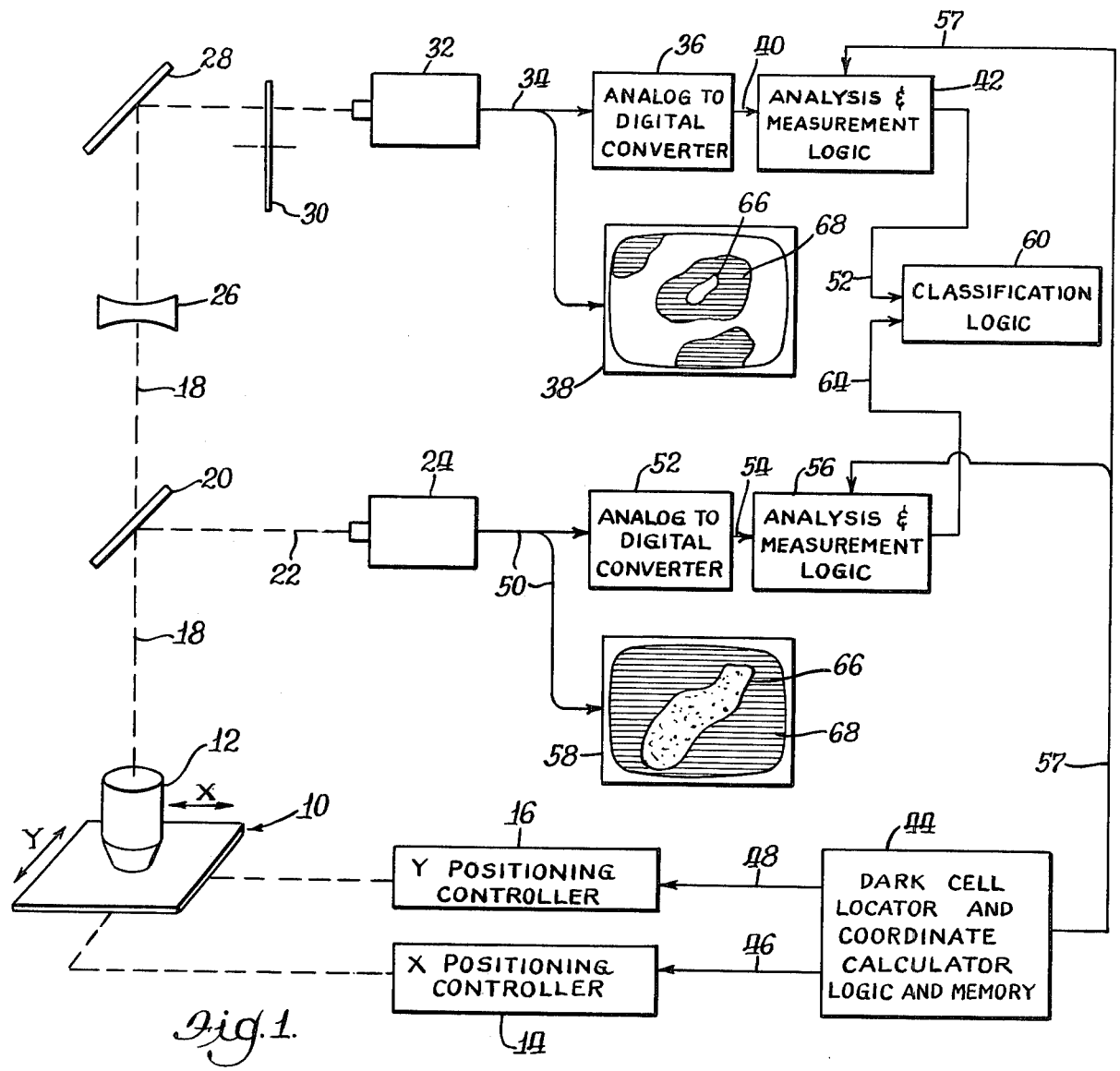
Figure 2:
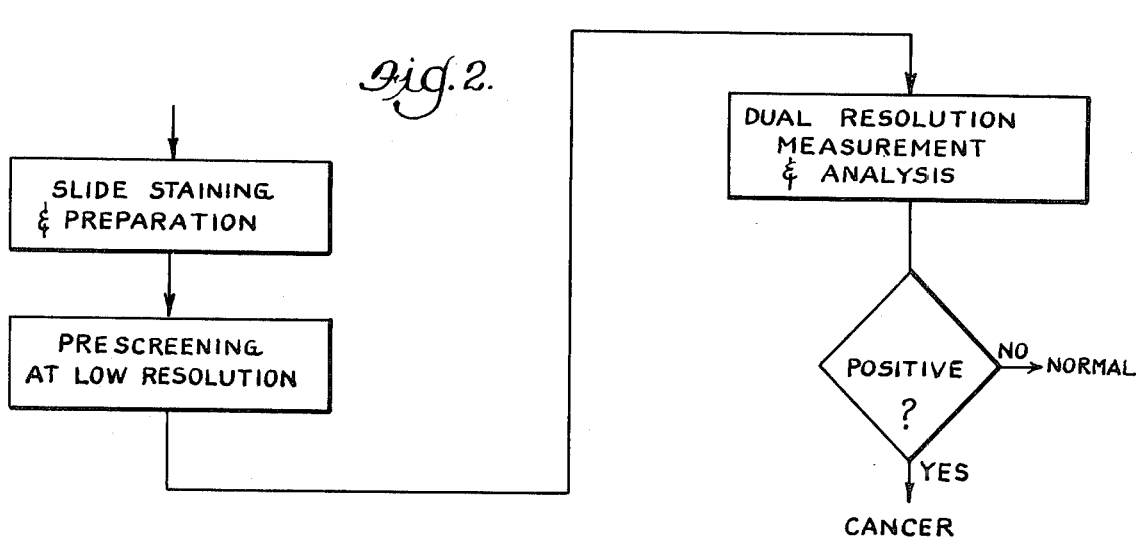
FIG. 2 is a block diagram illustrating the steps that are taken to classify cells.

Broadly stated, the present invention is directed to a method and apparatus for performing measurements and analysis of tissue and blood cells for the purpose of accurately classifying the cells of a sample. The present invention is particularly adapted for use in classifying suspicious or malignant cells of a pap smear. The invention involves the use of automation in the analysis and classification of cervical cytology slides prepared by conventional pap smear techniques for the purpose of determining malignancy, all of which is done essentially without visual inspection by laboratory technicians. The apparatus includes a stage upon which the slide is placed and the slide is positioned to a location where prescreening has dictated that a problem or suspicious cell is located. The prescreening is preferably done at a very low resolution which enables overall faster speeds to be attained in completing the entire slide. The prescreening is carried out by scanning the slide, preferably using an electronic optical scanning technique with an objective lens of on the order of 10 power, for example, for the purpose of finding dark objects within a certain wavelength which exceed a predetermined threshold level, in which event the location of the dark object is written into an electronic memory. The memory information is then used to operate the controllers for positioning the stage so that the dark objects can then be subjected to additional measurements and analysis using dual resolution images so that accurate classification of the dark objects can be performed.

The slide is initially magnified by microscope objective optics to project the cell nucleus on an image scanning device or video sensor with sufficient resolution, (e.g., 0.1 to 0.2 microns in the image plane) such that various texture measurements and analysis can be performed. Simultaneously, the image obtained by the microscope objective optics is also split and directed along a second path which contains demagnification optics for increasing the field of view so that a larger scene of the entire cell as well as some of the surrounding area can be obtained. Through the use of a second image scanning device or video sensor, together with suitable color filters, measurement and analysis of the low resolution enlarged scene can be performed to obtain features that relate to the entire cell. After measurement and analysis of the low resolution scene is performed, which is accomplished at the same time and is parallel with the high resolution measurements, the features that are extracted from both the high resolution and low resolution scenes are combined by classification logic to classify the cells using all of the features that are available.

Prior art apparatus have generally attempted to strike a balance in the sampling resolution of an image so that the entire cell, including the nucleus, could be used in a single analysis. The problems with such prior art apparatus relate to the disproportionate comparative sizes of cytoplasm and nucleus in cervical epithelial cells. For example, cell nucleus sizes range from 2 to 18 microns in diameter, whereas cell cytoplasm sizes range from 8 to 95 microns in diameter. Also, state-of-the-art memory restrictions for digitized images place an upper bound of about 100×100 or 10,000 memory elements. Memory sizes above this are not only costly, but because of their size, contribute to prohibitively slow accessing of individual picture elements for measurement. For example, to obtain 0.2 micron nucleus resolution in one image and also measure the full extent of the cytoplasm of cells would require at least a picture memory size of 475×475, or 225,625 elements. Each of these elements would have to be accessed individually, for example, to perform a cell size measurement. On the other hand, at 0.7 microns resolution only a 136×136, or 18,496 element memory is necessary and size measurements can be made at correspondingly faster speeds. However, this results in only 14 sample points across the diameter of an average cell nucleus, clearly a very gross sampling for texture measurements. It has been demonstrated that nuclear texture classification accuracies are not sufficiently good at resolutions grosser about 0.25 microns. This is described in a thesis by N. J. Pressman, "Optical Texture Analysis for Automatic Cytology and Histology: A Markovian Approach," Ph.D. Thesis, Lawrence Livermore Laboratory, University of California, Livermore, October, 1976. Therefore it is clear that prior techniques have been inadequate to perform any meaningful texture measurements on the nucleus if the entire cell was to be included in the scene. They were inadequate because the digitized scene was not sufficiently detailed to enable measurements of nuclear texture to be taken. Through the use of the present invention, two or more scenes of the entire cell and of the nucleus are generally simultaneously generated which permits resolution of the cell nucleus of about 0.125 to about 0.250 microns to be obtained preferably using a 100×100 digital matrix. The entire cell is present on the larger field of view scene using a similar digital matrix which permits a resolution of about 0.7 to about 2.0 microns to be obtained.

Turning now to the drawings and particularly FIG. 1, apparatus embodying the present invention is schematically illustrated and includes a stage indicated generally at 10 which contains a cervical cytology slide which is to be analyzed. The stage 10 is adapted to be movable so that all portions of the slide can be brought under the microscope objective 12 optics for microscopic imaging. The stage 10 is controlled by X and Y positioning controllers 14 and 16, respectively, which preferably comprise conventional stepping mechanisms for changing the X and Y coordinates of the stage so that the entire slide can be systemmatically positioned beneath the microscope objective optics. During operation, the stage is preferably suitably indexed so that all areas of the slide that have suspicious cells can be imaged for further analysis. This occurs after a prescreening step has been performed whereby dark objects within a certain wavelength which exceed a threshold level were detected. This eliminates the clearly normal cells and red blood cells and reduces the number of cells that have to be more rigorously measured and analyzed. These problem cells are primarily darker and the threshold level is set to exclude the nuclei of red blood cells since they would be lighter than the dark objects of interest. When a dark object is located during prescreening, which may be the nucleus of a malignant cell, its location in terms of the X and Y coordinates is written into an electronic memory and this information is used to control the X and Y positioning controllers so that it can be subsequently positioned in optical proximity to the objective optics 12 for further analysis by the apparatus shown in FIG. 1.

Apparatus that can be used for the prescreening operation is well known in the art and may be of the type shown in U.S. Pat. No. 3,851,972 of Smith et al. or U.S. Pat. No. 3,970,841 of Green.

The microscope objective lens 12 is preferably a high power, high resolution objective lens, such as a 100X oil immersion objective lens. The image from the objective lens 12 is present on the path 18 where it is split by a beam splitter 20 and is present on path 22 where an image scanning device such as a vidicon camera 24 is positioned to receive the image and provide electrical signals that are representative of the scene that is received. The other image on path 18 from the beam splitter 20 passes through an optical reducer 26 which demagnifies the image and therefore provides a lower resolution scene containing a larger field of view. The image is reflected by a fold mirror 28, is preferably passed through a color filter wheel 30 and is projected onto another image scanning device, preferably a vidicon camera 32 which also provides electrical output signals that are representative of the scene received, i.e., that of the larger field of view. It should be understood to those skilled in the art that the schematic representation of FIG. 1 is not geometrically accurate and that the path lengths from the objective 12 to each of the cameras should be made equal so that both cameras receive the image simultaneously. The output of the vidicon camera 32 appears on line 34 which extends to an analog-to-digital converter 36 and a video monitor 38. The output of the A/D converter 36 is on line 40 which extends to measurement and logic circuitry 42. A dark cell locator and coordinate calculator logic and memory circuitry 44 interconnected with the prescreening apparatus is connected via lines 46 and 48 to control the X and Y positioning controllers 16 and 18, respectively. The output of the vidicon camera 24 appears on line 50 and extends to another analog-to-digital converter 52 which digitizes the signal and applies the same via line 54 to a second analysis classification logic circuitry 56. The output of the camera 24 is also applied by the line 50 to another video monitor 58. The circuitry 44 is also connected to the logic circuitry 40 and 52 via line 57 for synchronizing the overall operation and for providing the coordinate location of the cell of interest to these logic circuits. As will be more extensively described herein, the measurement and analysis that are performed on each of the scenes by the logic circuitry 42 and 56 is thereafter applied to classification logic circuitry 60 via lines 62 and 64, respectively. The classification logic 60 operates to perform a classification decision of a cell of interest utilizing all of the features that were extracted from the high and low resolution scenes of the cell and the analysis and measurements that were performed on these scenes.

The scenes from each of the cameras 24 and 32 is an analog signal that is operated on by the converters 36 and 52. The resulting digitized scene is preferably at least a 100×100 digital matrix (which therefore contains 10,000 picture elements or pixels) which are read into a memory associated with the logic circuits 42 and 56. An important aspect of the present invention involves the speed in which the measurement and analysis is carried out by the logic circuits 42 and 56. While the digital matrix may be of a larger size than the 100×100, an increased number of pixels may not be significantly beneficial because of the time in which the circuits need to process each pixel. Thus, the increased number of pixels will require increased processing time and the speed will be effectively decreased. An advantage of the present invention is that the low resolution scene provides a 100×100 digital matrix of the entire cell and provides sufficient detail to generate the features relating to cytoplasm color, density size and nucleus size and density. Increased detail would merely provide redundant information that would slow the overall analysis for extracting these features. Similarly, the increased detail provided by this high resolution scene enables an analysis of the texture of the nucleus to be carried out. Stated in other words, the simultaneous measurement and analysis of the nucleus using a high resolution digitized scene and of the entire cell using a low resolution digitized scene facilitates fast overall operation by using only the amount of picture element processing that is needed to extract the features that are of interest. This thereby minimizes time wasting analysis of redundant information data.

While the vidicon camera 24 is used to provide electrical signals that are representative of the image that is received and which is thereafter digitized by the A/D converter 52 and analyzed by the logic circuitry 56, it should be appreciated that the high resolution image may be projected onto a Fourier lens and the Fourier transformation may be used for analysis of the texture of the nucleus. In this regard, changes in texture would be contained in the high frequency component of the transformation. This technique is described in the article entitled "The Use of Coherent Optical Processing Techniques for the Automatic Screening of Cervical Cytologic Samples," R. E. Kopp, J. Lisa, J. Mendelsohm, B. Pernick, H. Stone and R. Wohlers, *Journal of Histochemistry and Cytochemistry*, Vol. 22, No. 7, pp. 598–604, 1974 and in another article by the same authors entitled "Coherent Optical Processing of Cervical Cytologic Samples," *Journal of Histochemistry and Cytochemistry*, Vol. 24, No. 1, pp. 122–137, 1976.

With respect to the specific operation of the apparatus, assuming that the prescreening procedure has been accomplished and that the stage 10 has generally been positioned to bring a suspicious dark object beneath the objective lens 12, the high resolution image is projected on the vidicon camera 24 and thereby provides a high resolution image of the nucleus of the cell. Thus, the stage 10 brings the nucleus of the problem cell under the objective 12 and a high resolution scene is shown by the video monitor 38 and the A/D converter provides a 100×100 pixel digital scene that is written into memory of and associated with the circuitry 56. The scene shown on the monitor 58 of the drawing is intended to illustrate a representative nucleus 66 together with some of the surrounding cytoplasm 68 of the cell, although the scene does not cover sufficient area to encompass the outer boundaries of the cell. Accordingly, the information that is primarily derivable from the high resolution scene of the nucleus involves the texture of a nucleus, which can be measured by various techniques hereinafter referred to and described. In addition to measuring and analyzing the texture of the nucleus, inclusion bodies that may be present can also be detected. The 100×100 pixel digital matrix of the nucleus provided by the 100 power objective lens enables sufficient resolution to be provided that the texture of the nucleus can be examined in a manner comparable to that performed by a clinical technician. The image from path 18 through the beam splitter 20 and demagnification optics 26 essentially lowers the resolution and enlarges the field of view so that as it is projected by the fold mirror 28 through the filter wheel 30 onto the vidicon camera 32, an analog output signal representing the scene is generated and applied to its associated monitor 38 and to the converter 36 so that the entire cell, including the cytoplasm thereof is available for viewing and for various measurements and analysis.

The color filter wheel 30 is preferably of the type which is divided into sections having different color filters therein, for the purpose of transmitting light of different colors or ranges of wavelengths from different sections that are projected to the vidicon camera 32. By utilizing different color scenes of the same image, boundary contrasts, masking and more accurate definition of artifacts and other objects can be performed. More particularly, the different color filtering permits such effects as (a) masking red cells that are not of interest, (b) masking clumps of lymphocytes which are not of interest, (c) more accurately defining the boundaries of the cytoplasm by using the different colored scenes which may have greater contrast, (d) defining artifacts and other impurities which are not of interest, and (e) enables cells that are very close together to be distinguished from one another, which thereby contributes to the accurate definition of the boundary of the cytoplasm of a particular cell of interest.

Figure 4:
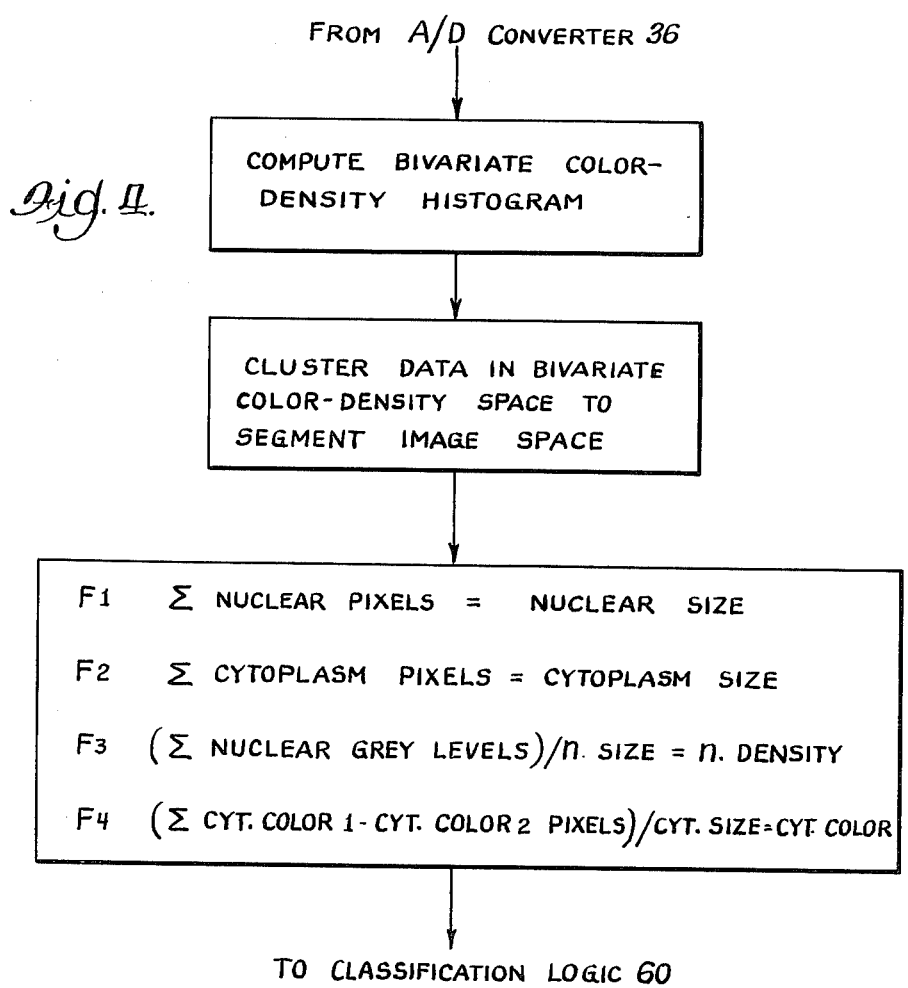
FIG. 4 is a flow diagram illustrating the steps that are performed to measure and analyze the low resolution scene, which results in four features of the cell being provided by logic circuitry.

The camera generates an analog output signal representative of each scene that is received through the color wheel and the resulting signal is applied to the A/D converter 36 and then to the analysis and measurement logic circuitry 42 which, as is shown in FIG. 4, performs three major steps: (1) computing the bivariate color-density histogram, (2) clustering the data in the color-density space to segment the picture elements in the image space, thus enabling the location of nucleus, cytoplasm and background in the digital image; and, (3) calculating the features. These techniques will be familiar to those skilled in the art, and have been described fully in three publications: (1) J. W. Bacus: "A Whitening Transformation for Two-Color Blood Cell Images" *Journal of Pattern Recognition*, 8:53-60, 1976; (2) J. K. Mui, Bacus, J. W. and K. S. Fu: "A Scene Segmentation Technique for Microscopic Cell Images," in proceedings of symposium on *Computer-Aided Diagnosis of Medical Images*, IEEE catalogue #76CH1170-0C, page 99–106, 1976; and (3) R. K. Aggarwal and J. W. Bacus, "A Multi-Spectral Approach for Scene Analysis for Cervical Cytology Smears," *Journal of Histochemistry and Cytochemistry*, Vol. 25, #7, 1977.

After the image has been segmented into nucleus, cytoplasm and background, the logic circuitry 42 proceeds to calculate four features, F1-F4. Feature F1 is nuclear size and is computed by summing the nuclear pixels. Feature F2 is the cytoplasm size and is computed by summing the cytoplasm pixels. Feature F3 is the nuclear density and is computed by summing the nuclear gray levels and dividing the sum by the nuclear size. Feature F4 is the cytoplasm color and is computed by summing the difference between corresponding cytoplasm pixels in one spectral image from the other spectral image and dividing the summed differences by the cytoplasm size. These techniques of feature computation have been fully described in the publication by J. W. Bacus and E. E. Goss: "Leukocyte Pattern Recognition" *IEEE Transactions on Systems, Man and Cybernetics*, SMC-2: Vol. 4, 513–526, 1972.

Figures 3A, 3B:
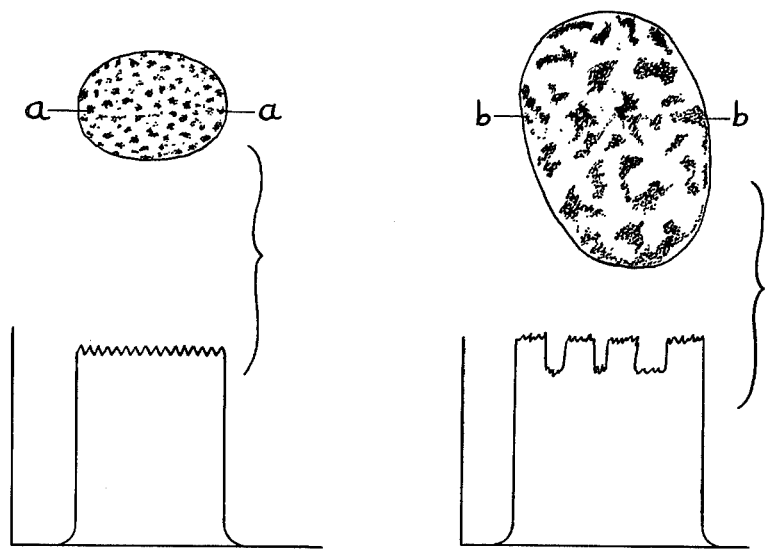
FIGS. 3a and 3b are views of the nucleus of representative normal and abnormal cells, respectively, including representative electrical signals generated which correspond to texture variations taken along the lines a—a and b—b of the respective cells.
Figure 5A:
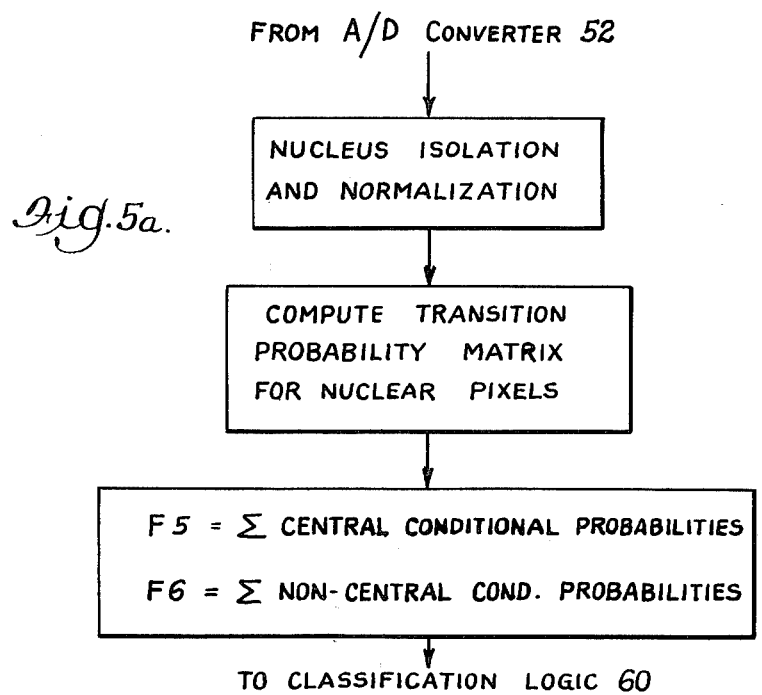
FIG. 5a is a flow diagram illustrating the steps that are performed to measure and analyze the high resolution scene, which results in two features of the mixture of the nucleus of the cell being provided.
Figure 5B:
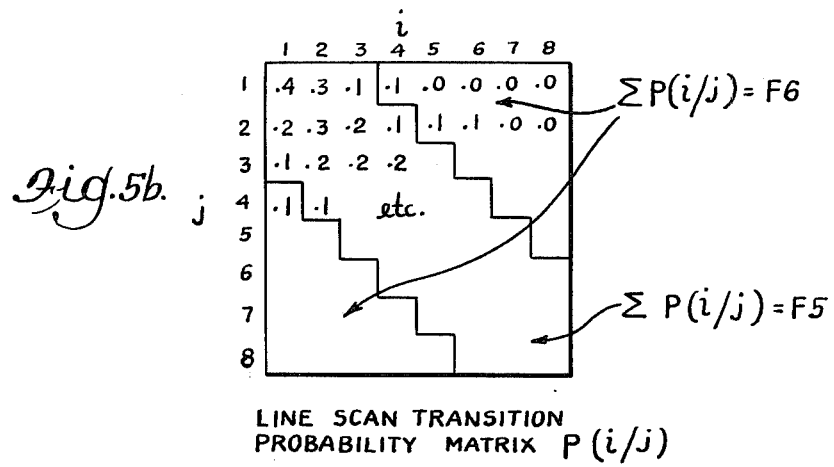
FIG. 5b is a probability matrix that is used to provide the two features that result from logic circuitry; and, FIG. 6 is a mathematical model of a multivariate Gaussian classification technique that may be performed by the classification logic circuitry.

With respect to the high resolution image that is projected to the vidicon camera 24 which provides electrical signals which are digitized by the A/D converter 52 for use by the analysis from classification logic 56. This high resolution scene is measured to find the boundary of the nucleus as well as to examine the image of the nucleus itself to determine the changes in texture by one or more techniques, such as pattern identification which may involve looking for ridges or the like throughout the nucleus or by statistical analysis by examination of the skewing of the shape of the histogram of the nucleus or by analysis of gray-level transition probabilities, or other technique which would be proportional to variations in the texture of the nucleus. The high resolution scene is also conducive to analysis for inclusion bodies, such as a nucleus within a nucleus, for example. This high resolution digital scene is much simpler than the above low resolution scene because it is simply comprised of nuclear pixels which are above a threshold value and all other pixels which are below a threshold value. More specifically, three steps are also performed by the logic circuitry 56 as shown in FIG. 5a: (1) nucleus isolation and normalization; (2) the computation of the line-scan transition probability matrix for the nuclear pixels; and, (3) the calculation of features F5 and F6. The first step involves computing the gray level histogram of the nuclear pixels and normalizing the original image by a nonlinear transformation which divides the gray level histogram into 8 gray level regions, each with an equal number of picture elements. The second computational stage involves computing the transition probability matrix for the nuclear pixels. In this case an 8×8 matrix is calculated such that the image is processed sequentially along each scan line, such as the scan line a—a of FIG. 3a for a normal cell and scan line b—b for an abnormal cell shown in FIG. 3b, and for each picture element of a specific gray level i with a previous neighbor of gray level j the matrix is incremented in the position (i,j). The graph below each nucleus shown in FIG. 3a and 3b represents the variation of the gray levels that are measured by the scan lines a—a and b—b for the respective normal and abnormal cells. After scanning the entire nucleus this matrix is normalized by dividing each element by the total number of picture elements in the nucleus. This provides the line scan transition probability matrix P(i/j). These first two analysis and measurement steps will be familiar to those skilled in the art and have been fully described in the publication by N. J. Pressman, "Markovian Analysis of Cervical Cell Images" *Journal of Histochemistry and Cytochemistry*, Vol. 24, No. 1, pp. 138–144, 1976. The next step performed by the logic circuitry 56 involves the computation of features F5 and F6. These are computed from the line scan transition probability matrix, a typical example of which is illustrated in FIG. 5b. These features are simply computed by summing the indicated elements in this matrix.

Figure 6:
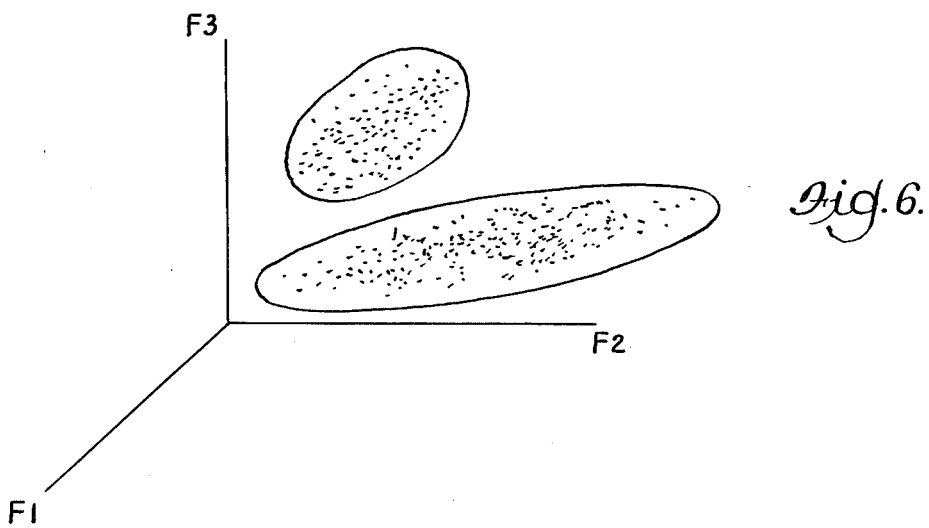

As indicated previously, these measurements are being performed simultaneously with the analysis done by the circuitry 42. When both logic circuits 42 and 56 have finished their analysis, the resulting data is sent via lines 52 and 64 to the classification logic 60. This classification logic proceeds according to the mathematical model shown in FIG. 6. It is known to those skilled in the art as the multivariate Gaussian classification technique. According to this method, the six feature measurements, F1 through F6, are representative of the cell in question being analyzed. This is a mathematical description of the subject cell in a six dimensional vector space, X. Each cell class will have a cluster in this vector space described by a mean vector and a covariance matrix. Given the unknown vector, the conditional probability of each class, P(j/X), is computed according to the expression $$p(j/X) = \frac{\exp\{-\frac{1}{2}[(X - M_j)^t Q_j^{-1}(X - M_j)]\}|Q_j|^{-\frac{1}{2}}p(j)}{\sum_{i=1}^{r} \exp\{-\frac{1}{2}[(X - M_i)^t Q_i^{-1}(X - M_i)]\}|Q_i|^{-\frac{1}{2}}p(i)}$$

P(j/X) — probability of class j given the unknown pattern vector X
X = {F1, F2, F3, F4, F5}
$M_j$ mean vector of class j
$Q_j$ covariance matrix of class j
p(j) a priori probability of class j
and the cell is classified according to the highest probability as shown in Table 1 where eight specific types of cells are classified as being normal or abnormal. This technique is more fully described in the publication by J. W. Bacus and E. Goss: "Leukocyte Pattern Recognition," referred to above.

TABLE 1

|  | Class j | Name |
|---|---|---|
| Normal | 1 | Superficial |
|  | 2 | Intermediate |
|  | 3 | Endocervical |
|  | 4 | Metaplastic |
|  | 5 | Parabasal |
| Abnormal | 6 | Dysplastic |
|  | 7 | Carcinoma in situ |
|  | 8 | Invasive Carcinoma |

From the foregoing, it should be appreciated that a method and apparatus has been described which has many advantages over prior art systems in that the dual resolution scenes can be simultaneously analyzed and measured to derive important features relating to the cytoplasm and the nucleus of a subject cell in a manner whereby the texture of the nucleus can be analyzed together with a lower resolution enlarged scene which permits the size, density and color of the cytoplasm to be measured, in addition to determining the ratios of the size of the nucleus to the cytoplasm. The dual resolution scenes of a single cell permit a significantly greater number of features to be extracted, including the significant texture analysis of the nucleus and, with all of these features, permits more accurate classification of malignant cells then have heretofore been possible. Moreover, the simultaneous dual analysis greatly increases the speed of operation of the apparatus.

Although the foregoing description is directed to a preferred embodiment of the invention for analyzing pap smears, it is to be appreciated that the dual simultaneous resolution method and apparatus described herein may also be used for analysis of other cells.

For example, red blood cells may be advantageously automatically analyzed with simultaneous low and high resolutions using the low resolution for extracting cell features such cell size and total hemoglobin content of the cell. With low resolutions, the cell image occupies a considerably smaller number of pixels than would be the case with a high resolution image of the same cell and it is possible to determine the size of the cells with sufficient accuracy by summing the pixels occupied by the cell using the low resolution image. Likewise, the total hemoglobin content for a red blood cell may be obtained by summing the gray levels at low resolution. The same process at a higher resolution necessarily requires a greater number of pixels and concomitant memory storage capacity and does not achieve any meaningful increase in accuracy in determining the hemoglobin content of the cell. On the other hand, for red blood cells, the high resolution image would be of particular value in distinguishing certain cells which have the same general shape and size at low resolutions but are distinguishable from one another at higher resolutions. By way of example, the small points or spicules on a spiculed cell may be readily observed and extracted to distinguish it from a round normocyte of the same general size. Similarly, at low resolutions, it may be difficult to distinguish between the sharp pointed end for the sickle cell from other generally pencil-shaped or oblong-shaped cells with rounded or duller ends. However, with the higher resolution for the boundary analysis, the sharper pointed ends on the sickle cells may be more easily extracted and used to segregate the sickle cells from other oblong cells.

The present invention may also be used to identify and classify neutrophils into two subcategories, (1) band neutrophils and (2) segmented neutrophils. The high resolution image may be used to extract the feature of the string or finger-like nuclei connections between adjacent nuclei masses in these neutrophils. This feature of the finger or string connections is available only at a high resolution and thus permits the segregation of subcategories of neutrophils from each other.

Thus, it will be seen that advantageous speed and memory economies may be made by making selective feature extractions using the optimum resolution image, such as the summing of pixels for cell size and for a gray level analysis using the low resolution image and extracting detailed features such as spicules or string-like connections and the like at high resolutions because they are not available at the lower resolutions heretofore used. As has been explained herein, the dual resolution aspect of the present invention, together with the simultaneous and parallel analysis of the dual images provides more reliably accurate and faster cell analysis and classification.

It is, of course, understood that although preferred embodiments of the present invention have been illustrated and described, various modifications thereof will become apparent to those skilled in the art and, accordingly, the scope of the present invention should be defined by the appended claims and equivalents thereof.

Various features of the invention are set forth in the following claims.

What I claim is:

1. A method of analyzing and automatically classifying a large number of cells in a field on a support, comprising the steps of:

prescreening the field of cells and designating the locations of objects in the field as subject cells for closer examination, bringing the subject cells into a position for a detailed analysis at a low resolution of the entire cell and at a higher resolution of an internal or nuclear portion of the cell, producing a large field of view image at high resolution including a high resolution image of the entire cell, demagnifying the large field of view image to produce a low resolution image of said entire cell with sufficient detail to extract features relating to the total cell, using only an internal portion of said large field of view to produce a high resolution image of substantially only the internal or nuclear portion of said subject cell and excluding substantially the remainder of the cell, simultaneously performing measurements and analysis on said low resolution image of the entire cell and on the internal or nuclear portion high resolution image including the extracting of features relating to texture of its internal or nuclear portion, and classifying the cells in the field based on the features extracted simultaneously from said different images having said different resolutions.

2. A method in accordance with claim 1 including the step of digitizing said low resolution and high resolution images into scenes of substantially equal size.

3. A method in accordance with claim 1 in which the step of measuring and analyzing the internal or nuclear portion of the cell comprises taking a scan for variations of grey levels and normalizing the scan to provide a line scan transition probability matrix and scanning the central conditional probabilities and scanning the non-central conditional probabilities.

4. An apparatus for analyzing and automatically classifying a large number of cells in a field on a support, comprising the steps of:

means for prescreening the field of cells and designating the locations of objects in the field as subject cells for closer examination and for bringing the subject cells into a position for a detailed analysis at a low resolution of the entire cell and at a higher resolution of an internal or nuclear portion of the cell, means for producing a large field of image at high resolution including a high resolution image of the entire cell, means for demagnifying the large field of view image to produce a low resolution image of said entire cell with sufficient detail to extract features relating to the total cell, means for using only an internal portion of said large field of view to produce a high resolution image of substantially only the internal or nuclear portion of said subject cell and excluding substantially the remainder of the cell, means for simultaneously performing measurements and analysis on said low resolution image of the entire cell and on the internal or nuclear portion high resolution image including the extracting of features relating to texture of its internal or nuclear portion, and means for classifying the cells in the field based on the features extracted simultaneously from said different images having said different resolutions.

5. An apparatus in accordance with claim 4 including means for digitizing said low resolution and high resolution images into scenes of substantially equal size.

6. An apparatus in accordance with claim 4 in which said means for measuring and analyzing the internal or nuclear portion of the cell comprises means for taking a scan for variations of grey levels and for normalizing the scan to provide a line scan transition probability matrix and for scanning the central conditional probabilities and for scanning the non-central conditional probabilities.

7. An apparatus for analyzing cells of a sample, comprising:

means for prescreening a field of cells and detecting locations of objects in the field and designating certain of these objects as subject cells for closer analysis, means for shifting a subject cell image relative to the analyzing equipment to bring it into position for a detailed analysis of the entire cell including an internal portion of the cell, means for holding said sample in optical proximity to an optical means;

optical means for producing a high resolution image of an entire cell and of an internal portion of a subject cell, said high resolution image being sufficient to provide detailed information concerning cell portion;

means for splitting said image into two paths;

opto-electronic means located in one of said paths for receiving said high resolution image of said internal portion and providing electrical signals representing said high resolution image of said internal portion;

first electrical circuit means connected to receive said output signals and provide measurement and analysis to determine features that are provided by the detailed information from said portion of said subject cell;

means in said second path for demagnifying said high resolution image of said entire cell to provide an enlarged field of view low resolution image that includes the entire cell;

second opto-electronic means for receiving said second low resolution image and providing electrical output signals that represent said low resolution image;

second electrical circuit means adapted to receive said electrical output signals from said second opto-electronic means and perform measurement and analysis to determine other features that are provided by the entire subject cell, said first and second electrical circuit means adapted to operate simultaneously to optimize the overall speed of the apparatus.

* * * * *